US009127649B2

(12) United States Patent  (10) Patent No.: US 9,127,649 B2
Matsuda  (45) Date of Patent: Sep. 8, 2015

(54) STATE DETECTION DEVICE FOR BEARING ROLLER, ROLLER BEARING DEVICE WITH SENSOR, AND WIND TURBINE GENERATOR

(71) Applicant: JTEKT CORPORATION, Osaka-shi, Osaka (JP)

(72) Inventor: Shinya Matsuda, Kashiba (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/092,163

(22) Filed: Nov. 27, 2013

(65) Prior Publication Data

US 2014/0157880 A1  Jun. 12, 2014

(30) Foreign Application Priority Data

Dec. 12, 2012 (JP) ................................. 2012-271473

(51) Int. Cl.
*F03D 11/00* (2006.01)
*F16C 41/00* (2006.01)
*F16C 19/52* (2006.01)
*F16C 33/52* (2006.01)

(52) U.S. Cl.
CPC .......... *F03D 11/0091* (2013.01); *F16C 19/522* (2013.01); *F16C 19/527* (2013.01); *F16C 33/526* (2013.01); *F16C 41/008* (2013.01); *F16C 19/525* (2013.01); *F16C 2233/00* (2013.01); *Y02E 10/722* (2013.01)

(58) Field of Classification Search
CPC .. F03D 11/0091; F16C 19/522; F16C 19/525; F16C 19/527; F16C 2233/00; F16C 33/526; F16C 41/008; Y02E 10/722

USPC ................................. 73/112.01, 862.322, 541
See application file for complete search history.

(56) References Cited

U.S. PATENT DOCUMENTS

| 4,175,430 | A | * | 11/1979 | Morrison et al. ........... 73/862.55 |
| 5,349,871 | A | * | 9/1994 | Naganuma ............... 73/862.635 |
| 5,503,030 | A | * | 4/1996 | Bankestrom ............. 73/862.627 |
| 5,952,587 | A | * | 9/1999 | Rhodes et al. ........... 73/862.541 |
| 6,535,135 | B1 | * | 3/2003 | French et al. ................. 340/682 |
| 6,687,623 | B2 | * | 2/2004 | Bailey et al. .................... 702/42 |
| 7,140,228 | B2 | * | 11/2006 | Heim ........................... 73/12.13 |
| 8,672,553 | B2 | * | 3/2014 | Matsuda et al. ............... 384/448 |
| 2008/0091361 | A1 | * | 4/2008 | Pecher ............................ 702/41 |

(Continued)

FOREIGN PATENT DOCUMENTS

| DE | 10 2004 026 246 A1 | 12/2005 |
| DE | 698 28 236 T2 | 12/2005 |
| DE | 10 2007 009 093 A1 | 8/2008 |
| DE | 10 2011 006 907 A1 | 10/2012 |

(Continued)

OTHER PUBLICATIONS

Extended Search Report issued in European Patent Application No. 13195096.6 dated May 22, 2014.

*Primary Examiner* — Freddie Kirkland, III
(74) *Attorney, Agent, or Firm* — Oliff PLC

(57) ABSTRACT

A state detection device according to the invention includes a strain gauge that detects a physical state of a tapered roller, and a processing portion that obtains a detection signal that is output from the strain gauge, performs processing on the detection signal, and transmits detection data obtained by performing the processing on the detection signal, to an outside. The strain gauge and the processing portion are accommodated in a through-hole formed at an axis center of the tapered roller.

14 Claims, 12 Drawing Sheets

(56) References Cited

U.S. PATENT DOCUMENTS

2010/0102801 A1* 4/2010 Takahashi et al. ....... 324/207.25
2011/0002572 A1* 1/2011 Miyachi et al. ............... 384/574
2011/0182536 A1 7/2011 Matsuda et al.
2012/0020603 A1 1/2012 Stubenrauch et al.

FOREIGN PATENT DOCUMENTS

| EP | 0 637 734 A1 | 2/1995 |
| EP | 2 354 578 A2 | 8/2011 |
| JP | A-2011-149538 | 8/2011 |
| WO | WO 2013/107886 A1 | 7/2013 |

* cited by examiner

STATE DETECTION DEVICE FOR BEARING ROLLER, ROLLER BEARING DEVICE WITH SENSOR, AND WIND TURBINE GENERATOR

INCORPORATION BY REFERENCE

The disclosure of Japanese Patent Application No. 2012-271473 filed on Dec. 12, 2012 including the specification, drawings and abstract, is incorporated herein by reference in its entirety.

BACKGROUND OF THE INVENTION

1. Field of the Invention

The invention relates to a state detection device that detects the state of a bearing roller, a bearing device with a roller sensor, and a wind turbine generator.

2. Description of Related Art

It is important to determine the physical state of a rolling bearing, such as a bearing load acting on the rolling bearing under actual usage environment of the rolling bearing, in order to optimize the design of the rolling bearing, to evaluate the durability of the rolling bearing, and to predict the service life of the rolling bearing. Therefore, conventionally, attempts have been made to measure a load acting on a rolling bearing by providing a load detection device for a bearing in a roller of a bearing, the load detection device including a sensor that detects the load acting on the roller and a recording device that is connected to the sensor through a sensor cable, and obtains and records an output of the sensor.

The load detection device for a bearing is a device that measures the load acting on the roller as a bearing load. The load detection device measures the load acting on the rolling bearing by fixing the sensor to an inner peripheral surface defining a through-hole formed at the axis center of the roller, and measuring the load acting on the roller by the sensor when the rolling bearing is operated (for example, Japanese Patent Application Publication No. 2011-149538 (JP 2011-149538 A)).

In the load detection device for a bearing in the related art, the sensor is fixed to the inside of the through-hole of the roller and the recording device is fixed to an end face of the roller so as to protrude in an axial direction. Therefore, it is necessary to secure an extra space for installing the recording device in the end face side of the roller in which a protrusion or the like is not originally present. Accordingly, in a case where it is not possible to secure an extra space, the load detection device for a bearing cannot be provided in the bearing. Thus, bearings to which the load detection device can be applied are limited.

In addition, since the recording device protrudes from the end face, when the roller is fitted in the rolling bearing, the recording device may come into contact with a peripheral apparatus. If the recording device comes into contact with a peripheral apparatus in this manner, damage to the recording device or breaking of a cable connecting the recording device and the sensor occurs, and thus there is also a concern that an abnormal operation may occur in the sensor or the like.

SUMMARY OF THE INVENTION

An object of the invention is to provide a state detection device for a bearing roller, a bearing device with a sensor, and a wind turbine generator, which make it possible to suppress occurrence of a malfunction in a sensor when the state detection device is fitted in a bearing, and to fit the state detection device in the bearing without the need of securing an extra space.

According to an aspect of the invention, there is provided a state detection device that detects a physical state of a bearing roller that is rollably disposed between a first bearing ring and a second bearing ring that is disposed concentrically with the first bearing ring, the state detection device including: a sensor that detects the physical state of the bearing roller; and a processing portion that obtains a detection signal that is output from the sensor, performs processing on the detection signal, and transmits detection data obtained by performing the processing on the detection signal, to an outside, wherein the sensor and the processing portion are accommodated in a central hole formed at an axis center of the bearing roller.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
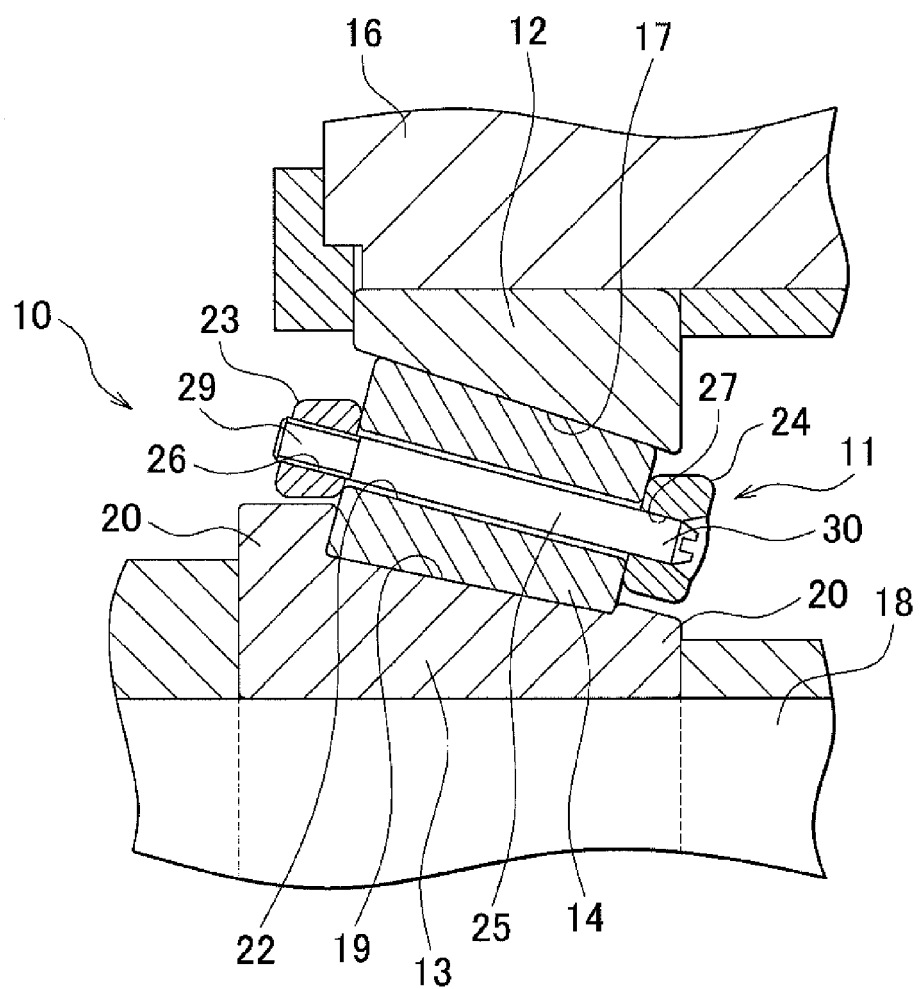
FIG. 1 is a sectional view of a tapered roller bearing to which a state detection device according to a first embodiment of the invention is applied.

Next, preferred embodiments of the invention will be described with reference to the accompanying drawings. FIG. 1 is a sectional view of a tapered roller bearing to which a state detection device according to a first embodiment of the invention is applied. A tapered roller bearing 10 in this embodiment includes a pin type cage 11. More specifically, the tapered roller bearing 10 includes an outer ring (a first bearing ring) 12, an inner ring (a second bearing ring) 13, a plurality of tapered rollers 14, and the pin type cage 11.

An outer peripheral side of the outer ring 12 is fixed to a housing 16, and the outer ring 12 has an outer ring raceway surface 17 at an inner peripheral side thereof, the outer ring raceway surface 17 being inclined with respect to an axial direction. One end portion of the outer ring 12 in the axial direction is formed to be thicker in a radial direction than the other end portion of the outer ring 12 in the axial direction, and thus, the outer ring 12 is formed to have a trapezoidal sectional shape. A rotary shaft 18 is fitted to an inner peripheral side of the inner ring 13, and the inner ring 13 has an inner ring raceway surface 19 at an outer peripheral side thereof, the inner ring raceway surface 19 being inclined with respect to the axial direction and facing the outer ring raceway surface 17. Flange portions 20 that restrict the axial movement of the tapered rollers 14 are formed on respective sides of the inner ring raceway surface 19 in the axial direction.

The tapered rollers 14 are disposed at intervals in a circumferential direction between the outer ring raceway surface 17 and the inner ring raceway surface 19 in a state in which the tapered rollers 14 are retained by the cage 11. A through-hole 22 is formed at an axis center of each of the tapered rollers 14. The through-hole 22 extends along the central axis of the tapered roller 14 and extends through the tapered roller 14.

The cage 11 includes a first ring 23 having an annular shape, a second ring 24 having an annular shape provided to be spaced apart in the axial direction from the first ring 23, and a plurality of round rod-shaped pins 25 connecting the first and second rings 23 and 24. In the first ring 23, a plurality of threaded holes 26 is formed to extend through the first ring 23 at intervals in the circumferential direction. The second ring 24 has an inside diameter smaller than the inside diameter of the first ring 23 and an outside diameter smaller than the outside diameter of the first ring 23, and a plurality of fitting holes 27 is formed in the second ring 24 at intervals in the circumferential direction.

A male thread portion 29 is formed at one end portion of each pin 25. The male thread portion 29 is screwed into the corresponding threaded hole 26 of the first ring 23. The other end portion 30 of the pin 25 is press-fitted into the fitting hole 27 of the second ring 24. Both ends of the pin 25 are screwed and press-fitted to the first and second rings 23 and 24, respectively, and thus, the pin 25 is fixed to the first and second rings 23 and 24. An intermediate portion of the pin 25 in a length direction thereof is inserted in the through-hole 22 of the tapered roller 14 and supports the tapered roller 14 so that the tapered roller 14 is rotatable.

The other end portion 30 may be welded to the periphery around the fitting hole 27 of the second ring 24 after press-fitting. For example, the other end portion 30 may be fixed to the second ring 24 by forming the pin 25 so that the outside diameter of the other end portion 30 allows the other end portion 30 to be fitted into the fitting hole 27 of the second ring 24 with a clearance in a range of about 0 to 0.1 mm being formed between the other end portion 30 and the fitting hole 27, and fitting the other end portion 30 into the fitting hole 27, and then performing welding from the end face side of the other end portion 30. In addition, with regard to the one end portion of the pin 25, instead of fixing the one end portion to the first ring 23 by screwing the male thread portion 29 to the first ring 23, the one end portion may be fixed to the first ring 23 by forming a fitting hole in the first ring 23, providing, in the one end portion of the pin 25, an insertion portion that is fitted into the fitting hole with a clearance in a range of about 0 to 0.1 mm being formed between the insertion portion and the fitting hole, inserting the insertion portion into the fitting hole, and then performing welding from the end face side of the insertion portion.

In the tapered roller bearing 10 having the above-described configuration, the inner ring 13 rotates due to the rotation of the rotary shaft 18. Due to the rotation of the inner ring 13, each tapered roller 14 revolves around the axis of the tapered roller bearing 10 while rotating around its own axis.

Figure 2A:
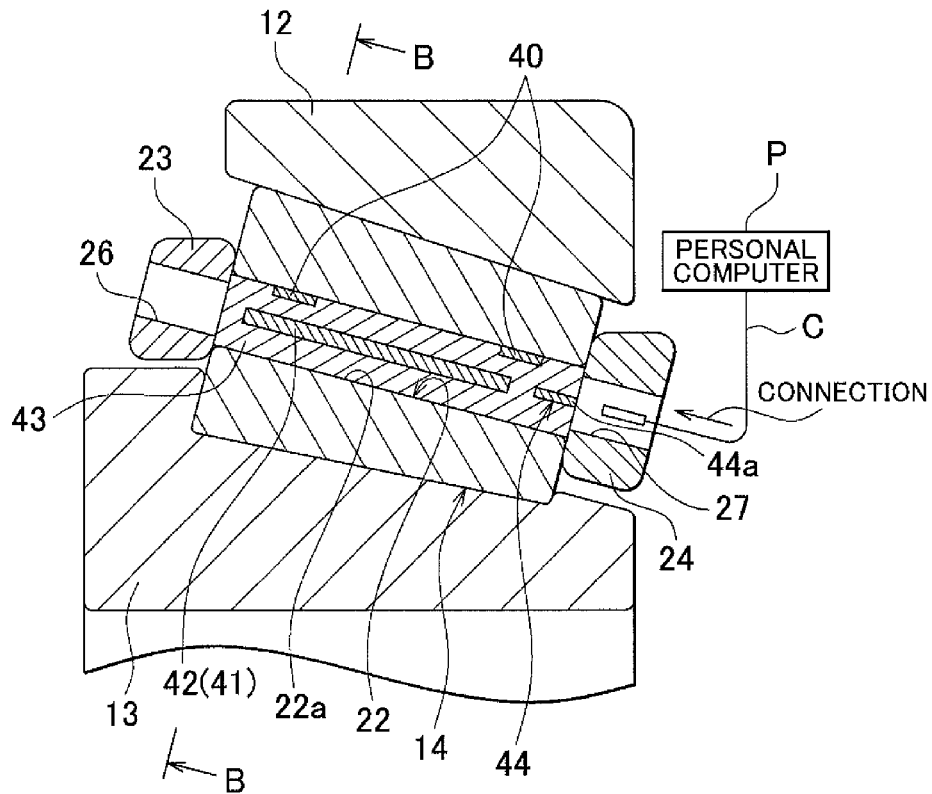
FIG. 2A is a sectional view of the tapered roller bearing that includes a tapered roller in which strain gauges and a processing portion are provided according to the first embodiment of the invention.

In this embodiment, a state detection device which detects the physical state of a roller is configured in at least one tapered roller 14 among the tapered rollers 14. Strain gauges that detect a load acting on the tapered roller 14 and a processing portion that processes an output signal of the strain gauge are provided in the state detection device. FIG. 2A is a sectional view of the tapered roller bearing 10 that includes the tapered roller 14 in which the strain gauges and the processing portion are provided. In FIG. 2A, strain gauges 40 and a processing portion 41 provided in the tapered roller 14 (hereinafter also referred to as a "detection target roller") are accommodated in the through-hole 22 of the tapered roller 14.

The strain gauges 40 detect the load acting on the tapered roller 14, as described above, and constitute a sensor that detects the load acting on the tapered roller 14 as the state of the tapered roller 14. The strain gauges 40 are provided at two locations, that is, respective end portions of the through-hole 22 in the axial direction, and the strain gauges 40 are solidly bonded and fixed to an inner peripheral surface 22a defining the through-hole 22. Each of the strain gauges 40 is connected to the processing portion 41 through a lead wire or the like and outputs a detection signal to the processing portion 41 through the lead wire.

The processing portion 41 has a function of obtaining the detection signals output from the strain gauges 40, performing processing on the detection signals, and transmitting detection data obtained by performing the processing on the detection signal, to the outside. The processing portion 41 is a function portion that is constituted by a circuit, an IC chip, and the like mounted on a substrate 42. Therefore, as shown in FIG. 2A, the substrate 42, on which the circuit, the IC chip, and the like constituting the processing portion 41 are mounted, is accommodated in the through-hole 22.

Figure 2B:
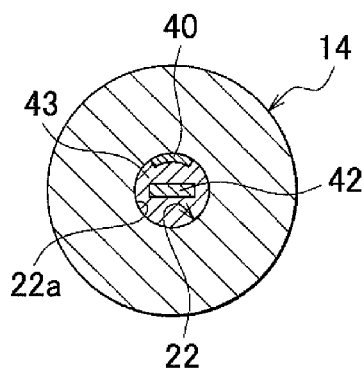
FIG. 2B is a sectional view taken along a line B-B and viewed in a direction of arrows in FIG. 2A.

FIG. 2B is a sectional view taken along a line B-B and viewed in the direction of arrows in FIG. 2A. As shown FIGS. 2A and 2B, the substrate 42 is accommodated in the through-hole 22 in a state in which the substrate 42 is not in contact with the inner peripheral surface 22a defining the through-hole 22. The inside of the through-hole 22 is filled with a substrate retaining material 43. The substrate retaining material 43 is formed of a rubbery elastic body, such as silicone rubber. The substrate retaining material 43 is formed by using a liquid material such as liquid rubber that is cured due to a temporal change, and thus becomes an elastic body. The substrate retaining material 43 is formed as an elastic body by pouring the liquid material into the through-hole 22, thereby filling the through-hole 22 with the liquid material, and then leaving it for a predetermined time, thereby curing the liquid material.

When the through-hole 22 is filled with the liquid material, first, each of the strain gauges 40 is bonded and fixed to the inner peripheral surface 22a defining the through-hole 22. Subsequently, the lead wire extending from each of the strain gauges 40 is connected to the substrate 42 (the processing portion 41), and the substrate 42 and a communication connector 44 (described later) are accommodated and retained at predetermined positions in the through-hole 22 by a jig or the like. At this time, the substrate 42 is retained in a state in which the substrate 42 is not in contact with the inner peripheral surface 22a defining the through-hole 22. Thereafter, the liquid material is poured into and filled in the through-hole 22. At this time, the liquid material is filled so as to be interposed between the substrate 42 and the inner peripheral surface 22a defining the through-hole 22. The liquid material is cured in this state, whereby the substrate retaining material 43 as an elastic body is formed in the through-hole 22.

The substrate retaining material 43 formed as described above is interposed between the substrate 42 and the inner peripheral surface 22a defining the through-hole 22 and retains the substrate 42 in the through-hole 22 in a state in which the substrate 42 is not in contact with the inner peripheral surface 22a defining the through-hole 22.

In this embodiment, the substrate 42 can be retained by the substrate retaining material 43 in a state in which the substrate 42 is not in contact with the inner peripheral surface 22a defining the through-hole 22. In this way, it is possible to suppress transmission of stress or vibration acting on the detection target roller to the substrate 42 through the inner peripheral surface 22a when the tapered roller bearing 10 is in an operation state. In this way, it is possible to suppress occurrence of a malfunction in the strain gauges 40 and the processing portion 41 due to damage to the substrate 42 caused by stress or vibration acting on the detection target roller.

In addition, the substrate retaining material 43 that is an elastic body has rigidity lower than the rigidity of the substrate 42 and more reliably suppresses transmission of stress or vibration acting on the tapered roller 14 to the substrate 42. As a specific material used for the substrate retaining material 43, for example, silicone rubber KE-1886 (manufactured by Shin-Etsu Chemical Co., Ltd.) that is cured at low temperature (around 100° C.) can be used.

Referring to FIG. 2A, the communication connector 44 is also accommodated in the through-hole 22. The communication connector 44 is connected to the processing portion 41 through a signal line or the like. The communication connector 44 is disposed in an opening portion of the through-hole 22 at the small-diameter end side of the tapered roller 14 such that a connection port 44a is exposed from the end face of the tapered roller 14. Therefore, the communication connector 44 is arranged at such a position that the connection port 44a can be approached from the fitting hole 27 formed in the second ring 24 of the cage 11. Due to such arrangement, it is possible to connect a communication cable extending from an external apparatus to the communication connector 44 through the fitting hole 27.

A communication cable C extending from a personal computer P installed outside is connected to the communication connector 44. The processing portion 41 transmits detection data based on the detection signals output from the strain gauges 40 to the personal computer P through the communication connector 44 and the communication cable C.

Figure 3:
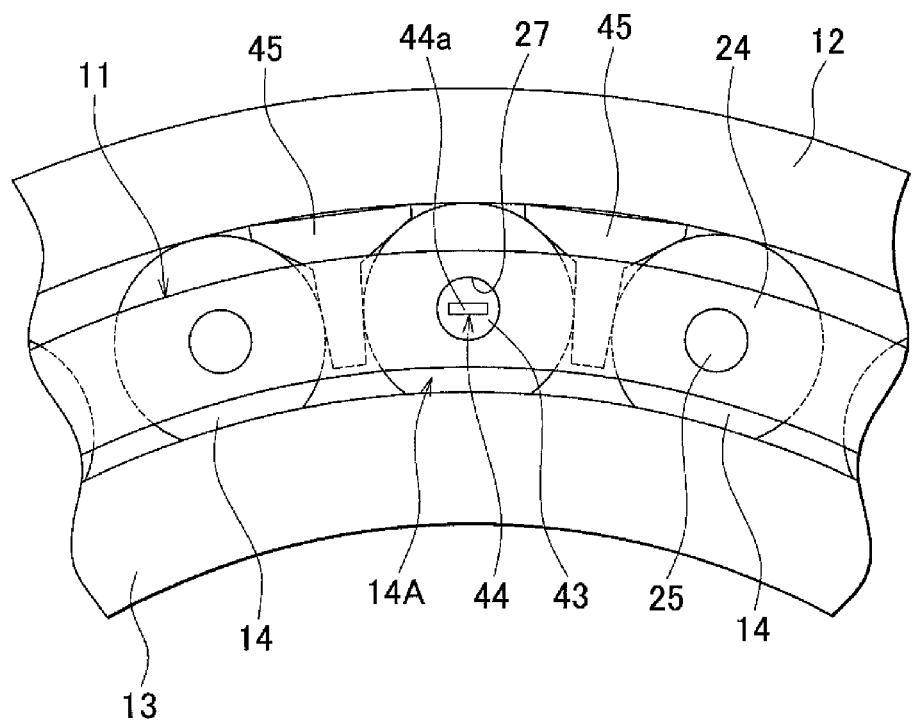
FIG. 3 is an external view when the tapered roller bearing including a detection target roller according to the first embodiment of the invention is viewed from a small-diameter end face side.

FIG. 3 is an external view when the tapered roller bearing 10 including a detection target roller 14A is viewed from the small-diameter end face side. The communication connector 44 is arranged at such a position that the connection port 44a can be approached from the fitting hole 27 formed in the second ring 24, as described above.

Since the substrate 42 and the substrate retaining material 43 are provided in the through-hole 22 of the detection target roller 14A, the pin 25 of the cage 11 cannot be inserted into the through-hole 22 of the detection target roller 14A. For this reason, in this embodiment, the circumferential position of the detection target roller 14A is maintained by separators 45 as shown in FIG. 3. Each of the separators 45 has a substantially T-shaped sectional shape. The separator 45 is disposed between the detection target roller 14A and each of the tapered rollers 14 on both sides of the detection target roller 14A. The separator 45 is in contact with an intermediate portion in the radial direction and an outer portion in the radial direction of each of the tapered rollers 14 and 14A, thereby keeping the distance between the tapered rollers 14 and 14A. Further, the separator 45 has substantially the same length as the axial length of the tapered roller 14 and is sandwiched between the first ring 23 and the second ring 24 with a clearance.

Figure 4A:
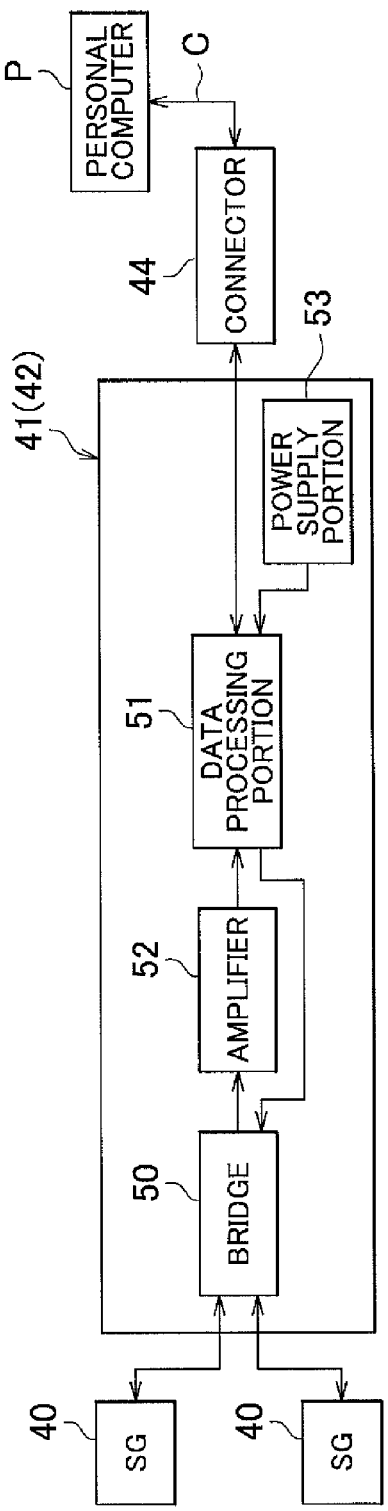
FIG. 4A is a block diagram showing the configurations of the strain gauges and the processing portion according to the first embodiment of the invention.

FIG. 4A is a block diagram showing the configurations of the strain gauges 40 and the processing portion 41. In the drawing, the processing portion 41 includes a bridge circuit 50 and a data processing portion 51. The strain gauges 40 are connected to the bridge circuit 50. The data processing portion 51 performs processing on the detection signals output from the strain gauges 40 or controls each of other portions by using the strain gauges 40 and the bridge circuit 50.

The data processing portion 51 is connected to the personal computer P so as to be able to perform communication with the personal computer P, as described above. Further, the data processing portion 51 provides a predetermined input voltage to the bridge circuit 50 so that the bridge circuit 50 outputs a detection signal based on the result of detection performed by the strain gauges 40. An amplifier 52 is connected to the bridge circuit 50. The bridge circuit 50 provides the detection signal to the amplifier 52. The amplifier 52 amplifies the detection signal provided thereto and provides the amplified detection signal to the data processing portion 51. When the amplified detection signal is provided to the data processing portion 51, the data processing portion 51 performs necessary processing on the detection signal. Detection data obtained by the processing is transmitted to the personal computer P through the data processing portion 51, the communication connector 44, and the communication cable C.

The processing portion 41 further includes a power supply portion 53 that supplies power to each portion. The power supply portion 53 is constituted by a secondary battery or a capacitor and is configured so as to be rechargeable. The power supply portion 53 can receive supply of power from, for example, the personal computer P through the communication cable C as charging power. The power supply portion 53 is connected to the data processing portion 51. The data processing portion 51 performs control relating to supply of power by the power supply portion 53 or charging of the power supply portion 53.

Figure 4B:
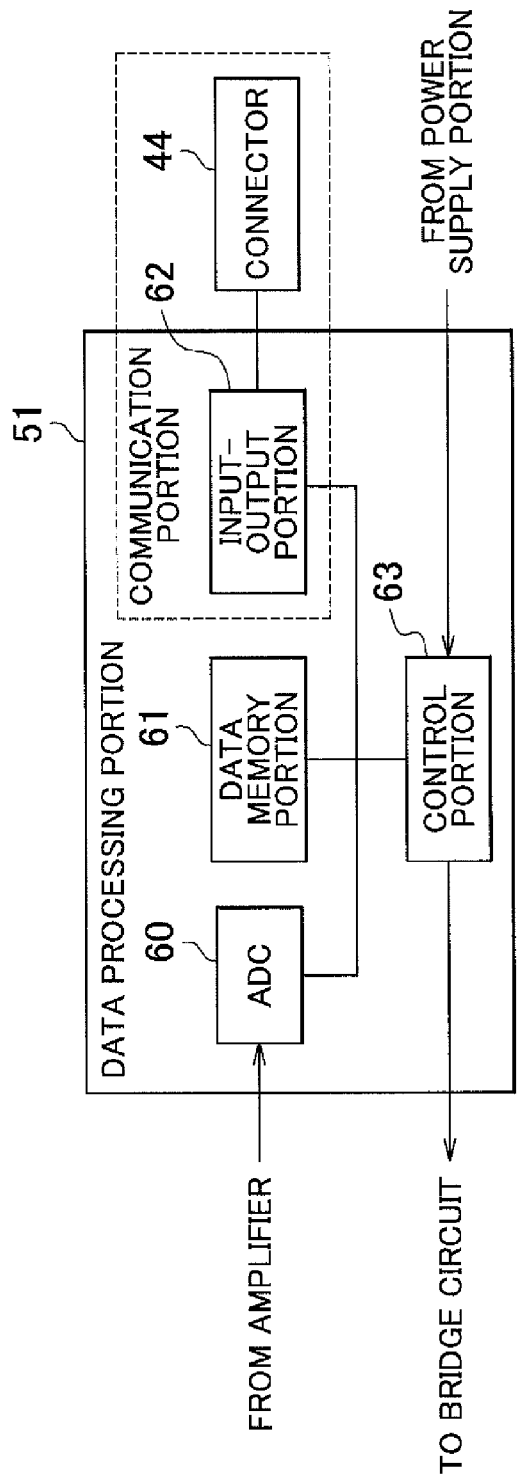
FIG. 4B is a block diagram showing the configuration of the data processing portion in FIG. 4A.

FIG. 4B is a block diagram showing the configuration of the data processing portion 51 in FIG. 4A. The data processing portion 51 includes an A/D converter (ADC) 60, a data memory portion 61, an input-output portion 62, and a control portion 63. The A/D converter 60 converts an analog detection signal, which has been provided from the amplifier 52, into a digital signal. The data memory portion 61 is a storage portion that stores the digital detection data obtained by performing digital conversion on the detection signal. The input-output portion 62 transmits the detection data toward an external apparatus such as the personal computer P.

The control portion 63 comprehensively controls the function portions 60, 61, and 62, and also controls an input voltage that is provided to the bridge circuit 50 and controls the power supply portion 53. The input-output portion 62 has a function of performing communication with the external apparatus such as the personal computer P through the communication cable C that is connected to the communication connector 44. The input-output portion 62 also receives control instruction and the like for the control portion 63 from the personal computer P, in addition to transmitting the detection data stored in the data memory portion 61. In this manner, the input-output portion 62 and the communication connector 44 constitute a communication portion.

In the processing portion 41 having the above-described configuration, the amplifier 52 amplifies the detection signal output from the bridge circuit 50 based on the detection signals output from the strain gauges 40 when a load acts on the tapered roller 14, and then, the amplified detection signal is converted to the digital detection data, and the detection data is stored and accumulated in the data memory portion 61. The data memory portion 61 has storage capacity allowing storage and accumulation of the detection data detected during a predetermined period of time. Accordingly, the processing portion 41 transmits the detection data detected during a predetermined period of time and stored and accumulated in the data memory portion 61, toward the external apparatus such as the personal computer P through the input-output portion 62 and the communication connector 44.

In this manner, in this embodiment, the detection data that is detected when the tapered roller bearing 10 is in an operation state is successively stored and accumulated in the data memory portion 61, and thereafter, when the tapered roller bearing 10 is stopped, the detection data accumulated in the data memory portion 61 is transmitted to the external apparatus through wire communication. Therefore, as compared to, for example, a case where detection data is successively transmitted through wireless communication or the like, it is possible to reduce the influence of noise or the like that is included in detection data.

The personal computer P that has received the detection data can determine the load acting on the tapered roller 14 on the basis of the detection data. In addition, the personal computer P can determine a bearing load acting on the entire tapered roller bearing 10. In this manner, in the personal computer P, it is possible to detect the load acting on the tapered roller 14, which is one element indicating the physical state of the tapered roller 14.

In the state detection device having the above-described configuration, since the strain gauges 40 and the processing portion 41 having a function of controlling the strain gauges 40 and a function of performing communication with the external apparatus are accommodated in the through-hole 22 of the tapered roller 14, there is no accessory or the like that is related to the strain gauge 40 and fixed to protrude from an end portion of the tapered roller 14. Therefore, it is possible to fit the detection target roller, in which the strain gauges 40 and the processing portion 41 are provided, in the tapered roller bearing 10 without the need of securing an extra space.

In addition, in the state detection device having the above-described configuration, since the strain gauges 40 and the processing portion 41 are accommodated in the through-hole 22, when the detection target roller is fitted in the tapered roller bearing 10, the strain gauges 40 and the processing portion 41 do not come into direct contact with a peripheral apparatus. Therefore, it is possible to suppress occurrence of a failure or a malfunction in the strain gauges 40 or the processing portion 41 due to the contact with the peripheral apparatus.

Figure 5:
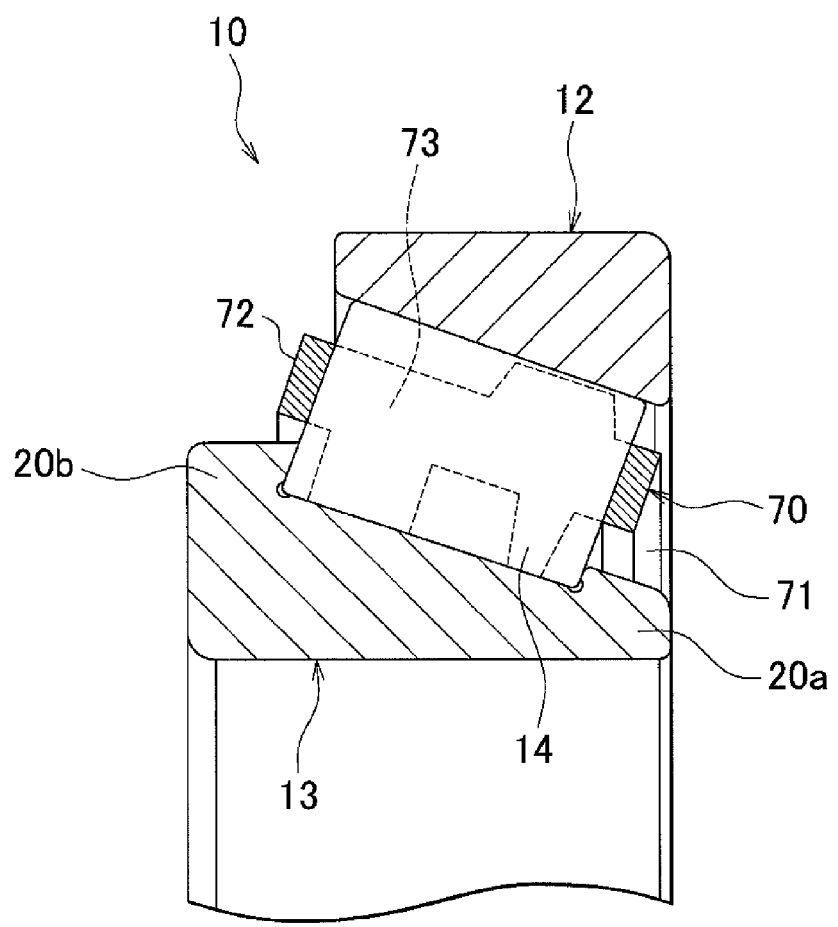
FIG. 5 is a sectional view of the tapered roller bearing to which a state detection device according to a second embodiment of the invention is applied.
Figure 6:
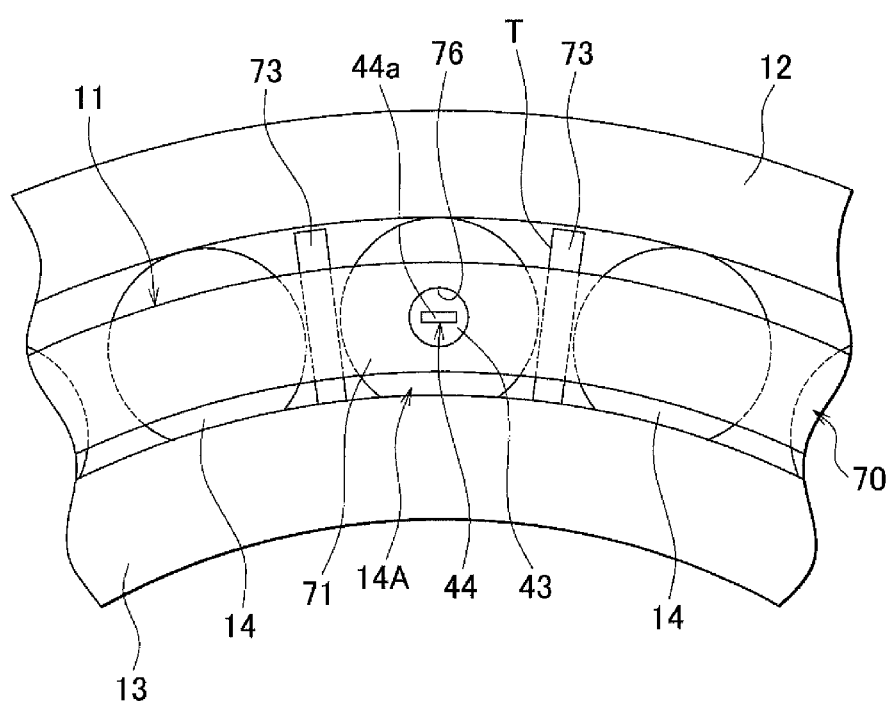
FIG. 6 is an external view when the tapered roller bearing that includes the detection target roller according to the second embodiment of the invention is viewed from the small-diameter end face side.

FIG. 5 is a sectional view of the tapered roller bearing 10 to which a state detection device according to a second embodiment of the invention is applied. FIG. 6 is an external view when the tapered roller bearing 10 that includes the detection target roller 14A is viewed from the small-diameter end face side. A split cage 70 is used in the tapered roller bearing 10 in this embodiment. The split cage 70 includes an annular small-diameter rim portion 71 that is disposed at the inner ring small flange 20*a*-side of the tapered roller bearing 10, an annular large-diameter rim portion 72 that is disposed at the inner ring large flange 20*b*-side of the tapered roller bearing 10, and a plurality of bar portions 73 provided at predetermined intervals in the circumferential direction so as to extend from the small-diameter rim portion 71 to the large-diameter rim portion 72. The split cage 70 is formed to have an annular shape by connecting a plurality of ladder-shaped members (segments) in the circumferential direction.

The split cage 70 is a member formed by injection molding by using synthetic resin such as Polyallomer (PA) or polyetheretherketone (PEEK). In the split cage 70, a space that is surrounded by the both rim portions 71 and 72 and two bar portions 73 adjacent to each other constitutes a pocket T in which the tapered roller 14 is accommodated and retained. Accordingly, the tapered roller 14 in this embodiment does not have the through-hole 22, unlike the tapered roller 14 in the first embodiment. Therefore, only the detection target roller has a hole that accommodates the substrate 42 on which the sensor and the processing portion 41 are mounted.

Figure 7:
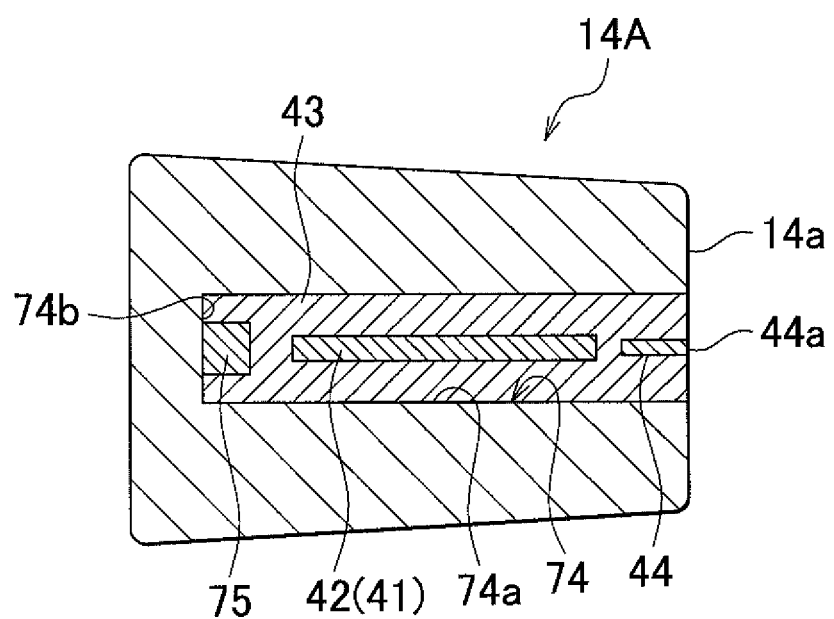
FIG. 7 is a sectional view of the detection target roller according to the second embodiment of the invention.

FIG. 7 is a sectional view of the detection target roller 14A according to the second embodiment. The detection target roller 14A according to this embodiment has a central hole 74 formed to extend along the axis center of the detection target roller 14A. The central hole 74 is formed as a bottomed hole opened at the small-diameter end face 14*a*-side of the detection target roller 14A.

As a sensor that detects the state of the tapered roller 14, a vibration sensor 75 that can perform measurement in three axial directions is fixed to a bottom 74*b* of the central hole 74. That is, in this embodiment, the configuration is made such that vibration of the tapered roller 14 is detected.

The inside of the central hole 74 is filled with the substrate retaining material 43 by the same method as that in the first embodiment. In this embodiment, since the central hole 74 is formed as a bottomed hole, a liquid material that is used to form the substrate retaining material 43 may be poured from an opening portion of the central hole 74, and thus, the inside of the central hole 74 is easily filled with the substrate retaining material 43.

The substrate 42, on which the processing portion 41 is mounted, is retained and accommodated in the central hole 74 by the substrate retaining material 43 in a state in which the substrate 42 is not in contact with an inner peripheral surface 74*a* and the bottom 74*b* of the central hole 74.

If the inner peripheral diameter of the central hole 74 is extremely large with respect to the outer peripheral diameter of the tapered roller 14, a decrease in strength may be caused. Therefore, it is preferable that the inner peripheral diameter of the central hole 74 should be set to be in a range of 20% to 30% with respect to the outer peripheral diameter of the tapered roller 14. With regard to the outer peripheral diameter, in the case of a cylindrical roller, the outer peripheral diameter is used as a reference, and in the case of a tapered roller as in this embodiment, the outer peripheral diameter of a small-diameter end is used as a reference.

Further, the communication connector 44 is also retained and arranged in an opening portion of the central hole 74 such that the connection port 44a is exposed from the end face of the tapered roller 14A, as in the first embodiment.

Referring to FIG. 6, in the small-diameter rim portion 71, a hole portion 76 is formed at a position corresponding to the connection port 44a of the communication connector 44. The communication connector 44 is arranged at such a position that the connection port 44a can be approached from the hole portion 76 formed in the small-diameter rim portion 71. Due to such arrangement, a communication cable extending from the external apparatus can be connected to the communication connector 44 through the hole portion 76.

The processing performed on detection data by the vibration sensor 75 and the processing portion 41 is the same as that in the first embodiment. As described above, even in a case where there is no through-hole in a tapered roller, by forming a central hole in which the sensor and the processing portion are accommodated and retained, it is possible to detect the state of the tapered roller.

Figure 8A:
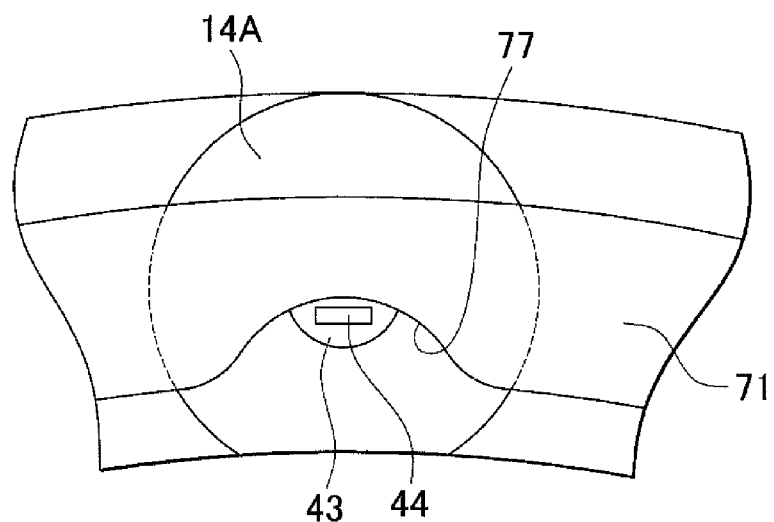
FIG. 8A and FIG. 8B are views showing a split cage according to another form of the second embodiment of the invention.
Figure 8B:
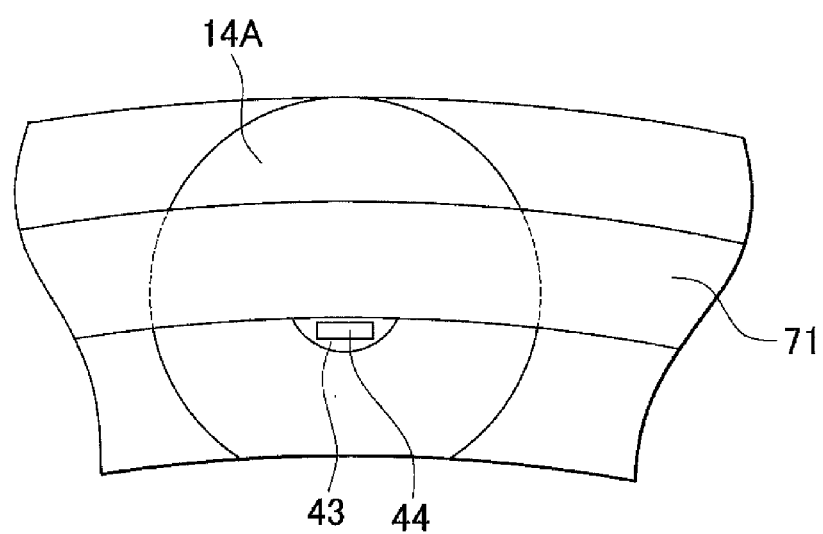

In the above-described embodiment, the configuration is made such that the communication cable extending from the external apparatus can be connected to the communication connector 44 by forming the hole portion 76 in the small-diameter rim portion 71 of the split cage 70. However, for example, as shown in FIG. 8A, a cut portion 77 may be formed such that the communication connector 44 can be approached from the outside, instead of the hole portion 76. Further, as shown in FIG. 8B, the position of the communication connector 44 may be offset in the radial direction as much as possible and the entire small-diameter rim portion 71 may have a shape that can avoid the communication connector 44.

Figure 9:
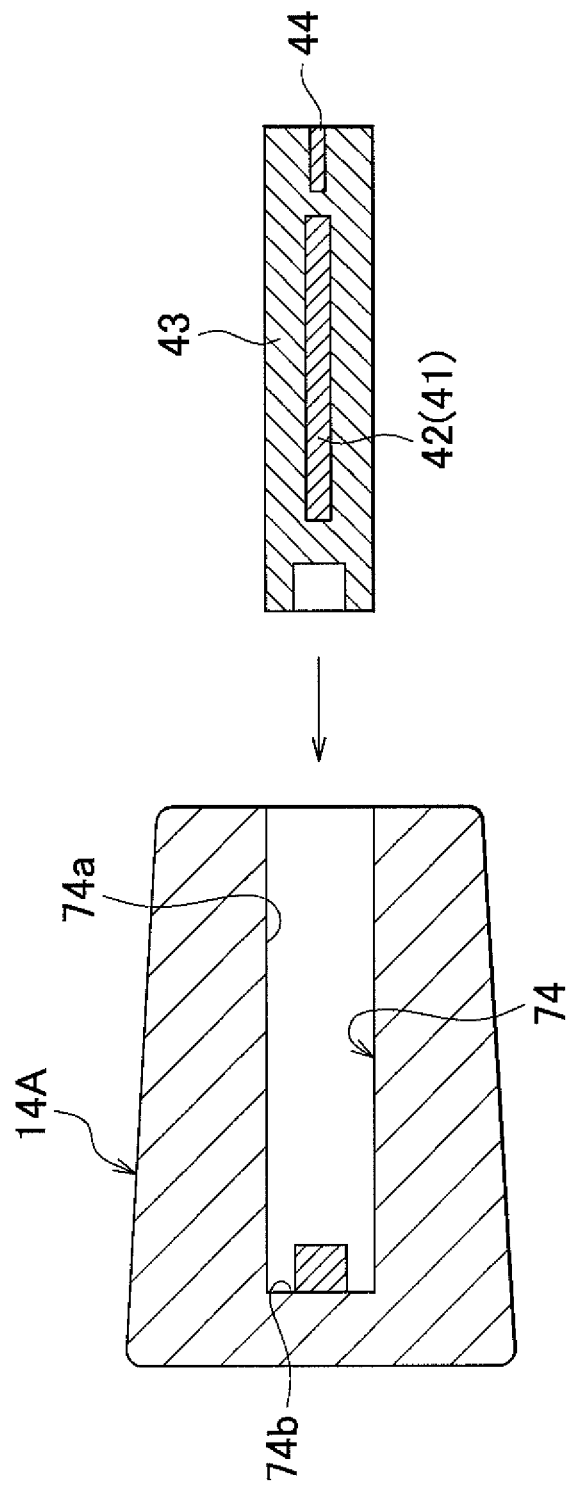
FIG. 9 is a view for explaining a manner in which a substrate retaining material that retains a substrate according to the second embodiment of the invention is inserted in a central hole.

Further, in the above-described embodiment, the substrate retaining material 43 is formed in the central hole 74 by pouring the liquid material that is used to form the substrate retaining material 43, into the central hole 74. However, for example, as shown in FIG. 9, the substrate retaining material 43 formed in advance into an elastic body having a shape that can be inserted into the central hole 74 may be inserted into the central hole 74. In this case, since it is necessary to solidly fix the vibration sensor 75 to the detection target roller 14A, the vibration sensor 75 is fixed to the bottom 74b in advance. In the substrate retaining material 43 formed into the elastic body, the substrate 42 on which the processing portion 41 is mounted, and the communication connector 44 are retained so as to be arranged at predetermined positions.

As described above, by forming the substrate retaining material 43 in which the substrate 42 and the communication connector 44 are retained in advance, they can be easily handled, and the sensor and the processing portion 41 can be more easily accommodated in the central hole 74.

The invention is not limited to the above-described embodiments. In the above-described embodiments, the case is described where the processing portion 41 performs wire communication with the external apparatus such as the personal computer through the communication cable that is connected to the input-output portion 62 (FIG. 4B) and the communication connector 44 (FIG. 4B) extending from the input-output portion 62. However, for example, the configuration may be made such that communication is wirelessly performed with the external apparatus.

Figure 10:
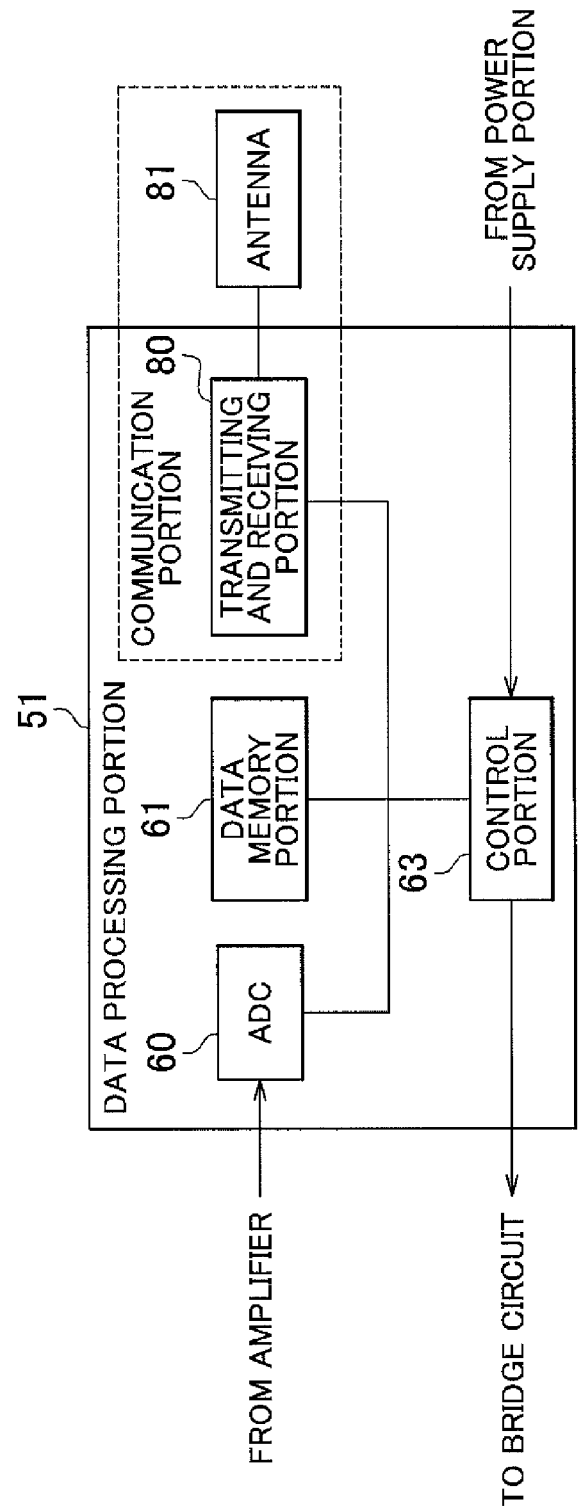
FIG. 10 is a block diagram of the data processing portion including a communication portion that can perform wireless communication according to the second embodiment of the invention.

FIG. 10 is a block diagram of the data processing portion 51 (the processing portion 41) including a communication portion that can perform wireless communication. In FIG. 10, the communication portion of the data processing portion 51 includes a transmitting and receiving portion 80 and an antenna 81, instead of the input-output portion 62 (FIG. 4B) and the communication connector 44 (FIG. 4B). The antenna 81 is embedded in the substrate retaining material 43 together with the substrate 42 so that the antenna 81 does not protrude to the outside.

The transmitting and receiving portion 80 and the antenna 81 have a function of performing wireless communication with the external apparatus. The data processing portion 51 can wirelessly transmit detection data toward the external apparatus by the transmitting and receiving portion 80 and the antenna 81. In this case, since the data processing portion 51 can transmit detection data to the external apparatus without connecting a communication cable to a communication connector, the detection data can be easily taken out to the outside. Further, since the communication connector does not need to be exposed for allowing a communication cable to be inserted into the communication connector from the outside, it is not necessary to perform machining on a cage or the like, or to change the shape of the cage or the like.

Further, since it is not necessary to connect a communication cable, the data processing portion 51 can perform communication with the external apparatus even when a roller bearing is operating. Accordingly, the data processing portion 51 can also wirelessly transmit detection data detected by a sensor to the external apparatus as it is, in a state where the roller bearing is operated.

In addition, in a case of wirelessly transmitting data detected by a sensor as it is, it is not necessary to store and accumulate the detection data in the data processing portion 51, and therefore, it is also possible to make a configuration excluding the data memory portion 61.

Further, the control portion 63 can also be configured so as to charge the power supply portion 53 (FIG. 4) when the antenna 81 receives a predetermined resonant frequency. In this case, it is possible to charge the power supply portion 53 in a non-contact manner.

As the sensor for detecting the physical state of the roller, in each of the above embodiments, a case of using a strain gauge and a vibration sensor is exemplified. However, in addition to these sensors, it is also possible to use a 3-axis gyro sensor in order to detect the behavior of a roller, such as a skew angle, and it is possible to use various sensors capable of detecting the physical state of a roller, such as a temperature sensor or an acceleration sensor.

Further, in each of the above-described embodiments, a case is shown where the state detection device is provided in each of the tapered roller bearing including the pin type cage and the tapered roller bearing including the split cage. However, the invention may also be applied to a bearing including another cage such as a machined cage or a pressed cage. Further, the invention can be applied not only to the tapered roller bearing shown in each of the above embodiments, but also to a rolling bearing using a roller as a rolling element, such as a cylindrical roller bearing or a spherical roller bearing.

Figure 11:
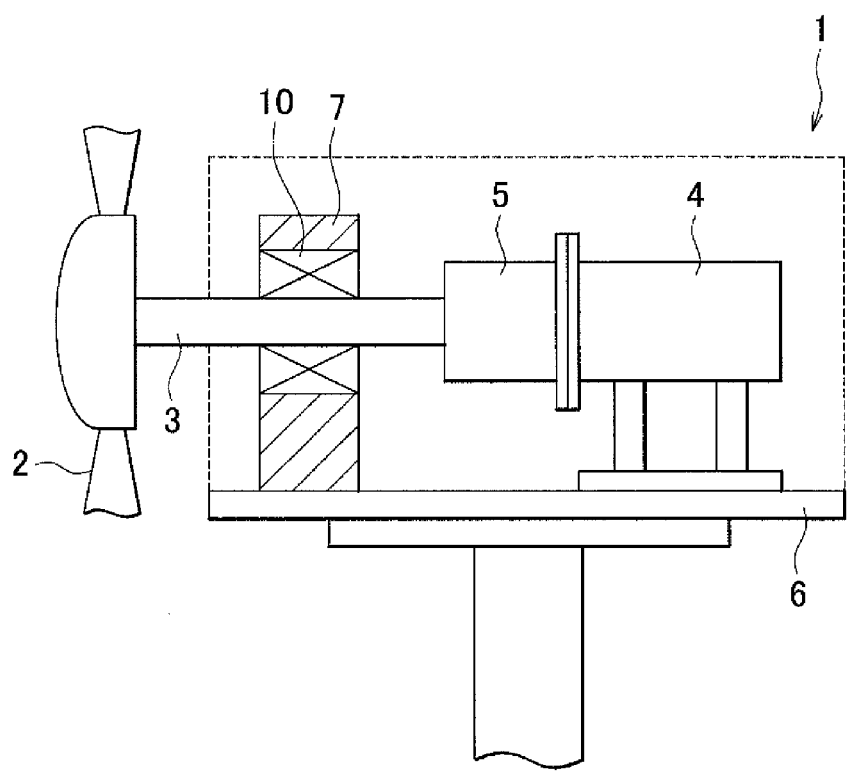
FIG. 11 is a schematic diagram of a wind turbine generator according to the second embodiment of the invention.

The tapered roller bearing 10, to which the state detection device is applied, shown in each of the above-described embodiments, can be suitably used as, for example, a bearing for supporting a main shaft of a wind turbine generator. FIG. 11 is a schematic diagram of a wind turbine generator. As shown in FIG. 11, a wind turbine generator 1 includes a main shaft 3, a generator 4, a speed increaser 5, and a support base 6 that supports these components. A rotor blade 2 that receives wind power is provided at one end of the main shaft 3 so that the rotor blade 2 is rotatable together with the main shaft 3. The generator 4 generates electricity by the rotation force of the main shaft 3. The speed increaser 5 connects the main shaft 3 and an input shaft (not shown) of the generator 4. The tapered roller bearing 10, to which the state detection device is applied, is fitted in a bearing housing 7 provided to stand on the support base 6, and the tapered roller bearing 10 supports the main shaft 3 so that the main shaft 3 is rotatable.

The main shaft 3 of the wind turbine generator 1 has a relatively large diameter, and in the large-sized wind turbine generator 1, the diameter of the main shaft 3 may be several meters. Therefore, the large-sized tapered roller bearing 10 that supports the main shaft 3 and the large-sized tapered roller 14 constituting the tapered roller bearing 10 are used. That is, since the tapered roller 14 has a large size, it is easy to secure a space accommodating the sensor, the substrate 42, and the like inside the tapered roller 14, and thus, it is particularly suitable to apply the state detection device shown in each of the above-described embodiments to the tapered roller bearing 10 that supports the main shaft 3 of the wind turbine generator 1.

Further, the wind turbine generator 1 needs to be continuously operated as long as possible (for example, for 20 years or more), because maintenance is not easy depending on the size or the installation environment (for example, on the ocean), and profitability deteriorates if an operation is stopped for a long period of time due to occurrence of a failure or the like.

In this regard, if the tapered roller bearing 10 to which the state detection device is applied is used as the roller bearing that supports the main shaft 3 of the wind turbine generator 1, it is possible to determine and monitor the state of the tapered roller bearing 10 without disassembling the wind turbine generator 1 and dismounting the tapered roller bearing 10. As a result, a failure occurring in the tapered roller bearing 10 can be prevented before it occurs, and the tapered roller bearing 10 can be continuously operated for a long period of time. Further, it is possible to predict occurrence of a failure or the service life of a component in advance, and even in a case of stopping an operation, it is possible to minimize an operation stop period.

In the state detection device for a bearing roller, the roller bearing device with a sensor, and the wind turbine generator according to the invention, it is possible to suppress occurrence of a malfunction in the sensor when the state detection device is fitted in a bearing, and to fit the state detection device in a bearing without the need of securing an extra space.

What is claimed is:

1. A state detection device that detects a physical state of a bearing roller that is rollably disposed between a first bearing ring and a second bearing ring, the second bearing ring being disposed concentrically with the first bearing ring, the state detection device comprising:
    a sensor that detects the physical state of the bearing roller;
    a processing portion that obtains a detection signal that is output from the sensor, performs processing on the detection signal, and transmits detection data obtained by performing the processing on the detection signal, to an outside of the bearing roller,
    the sensor and the processing portion being accommodated in a central hole formed at an axis center of the bearing roller, and
    the processing portion being provided on a substrate, and the substrate being accommodated in the central hole in a state in which the substrate is not in contact with an inner surface of the bearing roller, the inner surface defining the central hole; and
    a substrate retaining material that is interposed between the substrate and the inner surface defining the central hole, the sensor being fixed to the inner surface defining the central hole, and the substrate retaining material being interposed between the sensor and the substrate.

2. The state detection device according to claim 1, wherein the processing portion includes a storage portion that stores the detection data obtained by performing the processing on the detection signal output from the sensor.

3. The state detection device according to claim 2, wherein the substrate retaining material retains the substrate in the state in which the substrate is not in contact with the inner surface defining the central hole.

4. The state detection device according to claim 3, wherein the substrate retaining material is formed of a material having rigidity lower than rigidity of the substrate.

5. A roller bearing device with a sensor comprising:
    a first bearing ring;
    a second bearing ring that is disposed concentrically with the first bearing ring;
    a plurality of bearing rollers that is rollably disposed between the first bearing ring and the second bearing ring; and
    a state detection device that detects a physical state of at least one of the bearing rollers,
    wherein the state detection device is the state detection device according to claim 3.

6. A roller bearing device with a sensor comprising:
    a first bearing ring;
    a second bearing ring that is disposed concentrically with the first bearing ring;
    a plurality of bearing rollers that is rollably disposed between the first bearing ring and the second bearing ring; and
    a state detection device that detects a physical state of at least one of the bearing rollers,
    wherein the state detection device is the state detection device according to claim 2.

7. A wind turbine generator comprising:
    a main shaft having one end at which a rotor blade that receives wind power is provided so as to be rotatable together with the main shaft;
    a generator that generates electricity by rotation force of the main shaft; and
    a bearing device that supports the main shaft so that the main shaft is rotatable,
    wherein the bearing device is the roller bearing device with the sensor according to claim 6.

8. The state detection device according to claim 1, wherein the substrate retaining material retains the substrate in the state in which the substrate is not in contact with the inner surface defining the central hole.

9. The state detection device according to claim 8, wherein the substrate retaining material is formed of a material having rigidity lower than rigidity of the substrate.

10. A roller bearing device with a sensor comprising:
    a first bearing ring;
    a second bearing ring that is disposed concentrically with the first bearing ring;
    a plurality of bearing rollers that is rollably disposed between the first bearing ring and the second bearing ring; and
    a state detection device that detects a physical state of at least one of the bearing rollers,
    wherein the state detection device is the state detection device according to claim 9.

11. A roller bearing device with a sensor comprising:
a first bearing ring;
a second bearing ring that is disposed concentrically with the first bearing ring;
a plurality of bearing rollers that is rollably disposed between the first bearing ring and the second bearing ring; and
a state detection device that detects a physical state of at least one of the bearing rollers,
wherein the state detection device is the state detection device according to claim 8.

12. A wind turbine generator comprising:
a main shaft having one end at which a rotor blade that receives wind power is provided so as to be rotatable together with the main shaft;
a generator that generates electricity by rotation force of the main shaft; and
a bearing device that supports the main shaft so that the main shaft is rotatable,
wherein the bearing device is the roller bearing device with the sensor according to claim 11.

13. A roller bearing device with a sensor comprising:
a first bearing ring;
a second bearing ring that is disposed concentrically with the first bearing ring;
a plurality of bearing rollers that is rollably disposed between the first bearing ring and the second bearing ring; and
a state detection device that detects a physical state of at least one of the bearing rollers,
wherein the state detection device is the state detection device according to claim 1.

14. A wind turbine generator comprising:
a main shaft having one end at which a rotor blade that receives wind power is provided so as to be rotatable together with the main shaft;
a generator that generates electricity by rotation force of the main shaft; and
a bearing device that supports the main shaft so that the main shaft is rotatable,
wherein the bearing device is the roller bearing device with the sensor according to claim 13.

* * * * *